Inventor
CONRAD H. HOEPPNER
By Ralph L Chappell
Attorney

Sept. 5, 1961 C. H. HOEPPNER 2,999,128

PULSE COMMUNICATION SYSTEM

Filed Nov. 14, 1945 4 Sheets-Sheet 2

Inventor

CONRAD H. HOEPPNER

By Ralph L Chappell

Attorney

PULSE COMMUNICATION SYSTEM

Filed Nov. 14, 1945 4 Sheets-Sheet 3

Inventor
CONRAD H. HOEPPNER

By Ralph L. Chappell

Attorney

Sept. 5, 1961 C. H. HOEPPNER 2,999,128

PULSE COMMUNICATION SYSTEM

Filed Nov. 14, 1945 4 Sheets-Sheet 4

Inventor
CONRAD H. HOEPPNER

By Ralph L. Chappell

Attorney

United States Patent Office 2,999,128
Patented Sept. 5, 1961

2,999,128
PULSE COMMUNICATION SYSTEM
Conrad H. Hoeppner, Washington, D.C.
Filed Nov. 14, 1945, Ser. No. 628,639
1 Claim. (Cl. 178—43.5)
(Granted under Title 35, U.S. Code (1952), sec. 266)

The invention relates in general to radio communication and in particular to radio pulse type communication in the presence of interference.

In a space free of any interfering signal and in the absence of any uninvited monitoring receiver, radio communication requires no special means to achieve such desirable features as specificity, reliability, and secrecy. By specificity is meant the ability to discriminate between a desired signal and an interfering signal comprising either atmospheric disturbances or man-made interference. True specificity requires that a number of conditions be established which must be satisfied before a communication receiver responds to indicate the receipt of an intelligence. Those conditions must be such that there is only the remotest possibility that they will be satisfied accidentally or deliberately. In the latter case, the specificity cannot, of course, extend itself to provide for the situation in which an interfering signal is produced with knowledge of the receiver's characteristics. By reliability is meant the ability of the receiver to respond to a desired signal even in the presence of an interfering signal. It will be seen that, with no specificity requirement, and under stable operating conditions, reliability may often be achieved merely by so increasing transmitted signal strength and decreasing receiver sensitivity that only the transmitted signal is effectively received. As will be explained hereafter, the problem is rarely as simple as this. The secrecy feature is an obvious advantage and is tied in with specificity to the extent that specificity may be employed to achieve secrecy. For example, a desired transmission may consist of a succession of message elements each spaced in time in such a fashion that, while the elapsed time may be long, the total interval during which energy is emitted by the transmitter may be only a small fraction of the elapsed time. The remaining larger fraction of the elapsed time may be filled with masking signals which are rejected by the intended receiver but which hopelessly confuse an uninvited receiver not so endowed with specificity.

Rarely, however, does a communication system operate in a space free of any interfering signal and in the absence of any uninvited receiver. Perhaps the problems are most outstanding in military communication since there are added to all the obstacles of ordinary communication the signals generated and transmitted by the enemy to jam a receiver or render a transmission unintelligible. Also, an uninvited receiver in the hands of the enemy is a greater potential source of embarrassment than one in the hands of the idly curious. Thus, military communication, if it is to achieve specificity, reliability, and secrecy must cope with atmospheric disturbances, transmissions of other messages by friendly sources, reflections of its own message elements, fading during transmission, monitoring by enemy receivers, radical changes in operating conditions, and jamming by enemy transmitters.

Atmospheric disturbances may to a large extent be overcome by the several means and methods, including provision for specificity, well known to the art. Friendly transmissions may be similarly overcome. The problem of reflections is a somewhat less familiar one but one which may nevertheless be solved by such means as proper antenna design and location and signal amplitude control ("quick acting" automatic volume control).

Fading problems may be solved by means known to the art within limits which are fixed in some cases by physical conditions and in some by practical considerations. Monitoring by enemy receivers may, to a certain extent, be avoided by a discrete choice of frequency channel in combination with a limited time usage of that channel, i.e., time spaced pulses of very short duration. Where monitoring cannot be avoided, it may be rendered harmless by deliberate masking of the message endowed elements by means of transmissions which are ignored by the desired receiver. Radical changes in operating conditions may be overcome in part by those means employed to overcome reflections and fading including the use of signal amplitude control in the receiver. Jamming by enemy transmitters is a problem which has been only partially solved and then by means which favor reliability at the expense of secrecy and specificity.

It is an object of this invention to provide method and means for radio communication in which there exists a high degree of reliability, specificity and secrecy.

It is another object of this invention to provide a system of radio pulse communication in which the receiver has not only the ability to respond only to a particular signal and the ability to respond to that particular signal regardless of preceding signals but also the ability to so respond even in the presence of interfering signals.

It is another object of this invention to provide a system of radio pulse communication which reduces greatly the possibility of jamming.

It is another object of this invention to provide a system in which the features of specificity and reliability are combined to achieve an improvement in radio pulse communication.

Other objects and features of this invention will become apparent upon a careful consideration of the following detailed description when taken together with the accompanying drawings in which:

FIG. 6 illustrates a variant embodiment of this invention.

Figure 1:
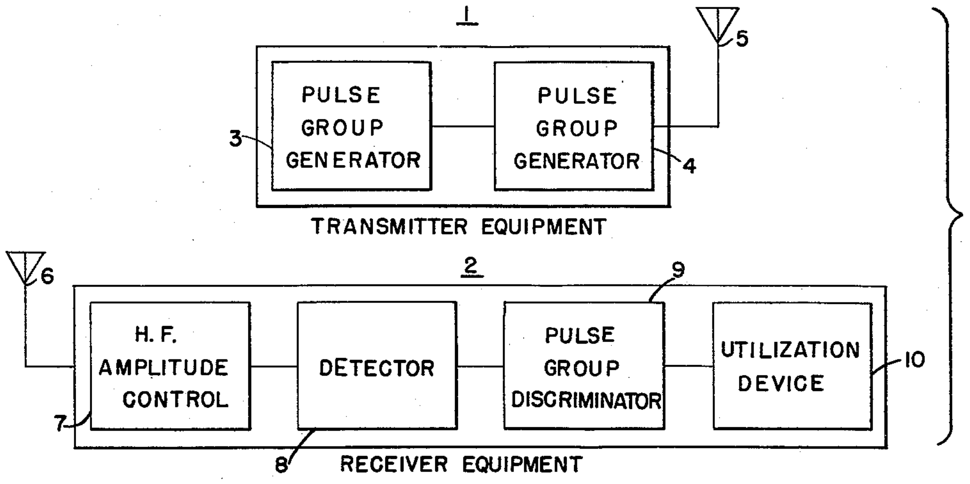
FIG. 1 illustrates one embodiment of this invention in block diagram form.

Reference is now had in particular to FIG. 1 in which is shown in block diagram form one embodiment of this invention. Transmitter equipment 1 represents a means of emitting pulse type signals in a predetermined manner and receiver equipment 2 represents a means of responding to the emitted signals so as to complete the process of communication. In this preferred form, transmitter equipment 1 comprises, in addition to the usual auxiliary and power circuits, pulse group generator 3, pulse type transmitter 4, and antenna 5. Antenna 5 may be of any desired type and may be either directional or omnidirectional although the directional has advantages in cases in which the receiver location is known. Pulse type transmitter 4 may also take a variety of forms provided it is capable of producing pulses or bursts of high frequency energy of relatively high peak power in accordance with the pulse group structure determined by pulse group generator 3. Pulse group generator 3 is preferably of the multipulse type described in detail in my copending application, Serial No. 628,637, entitled "Pulse Group Generator," filed November 14, 1945. By means of the generator therein disclosed, it is possible to produce a group of pulses comprising a predetermined number of predeterminedly time related pulses each of a predetermined duration. For example, a group of five pulses may be generated, each having the same width and each separated one from the other by a time spacing which is small compared to the individual pulse duration. This particular pulse group structure has the characteristic that it so fully occupies the time interval of the group that no additional complete pulse could be included by a reduction of the pulse-to-pulse spacing. In other words, the five pulses constitute the maximum number that may be included in the predetermined interval defining the pulse group as a whole.

Figure 2:
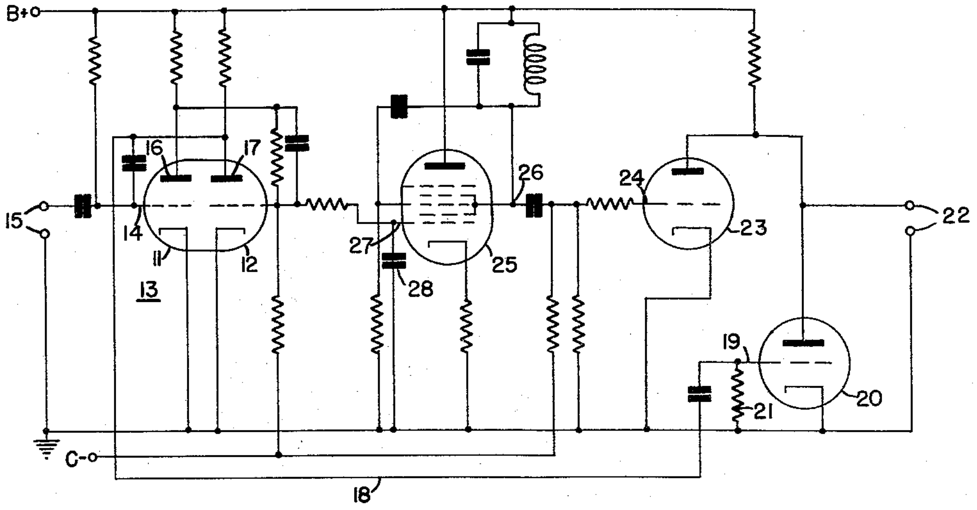
FIG. 2 illustrates by circuit diagram one of the forms which a component of FIG. 1 may assume.

For illustration of an actual circuit of the character just outlined, reference is now had to FIG. 2. The pulse group generator shown therein is, as mentioned above, described in detail in my copending application Serial No. 628,637. Briefly however, tube elements 11 and 12 and their immediately associated circuit elements comprise a conventional "one kick" or delay multivibrator 13. Multivibrator 13 has only one stable state, that which it assumes by virtue of the connection of grid 14 to B+. This state is characterized by the conducting condition of tube 11 and the non-conducting condition of tube 12. A negative triggering signal at input terminals 15 and hence at grid 14 causes tube 11 to be rendered nonconducting, tube 12 to be rendered conducting, and multivibrator 13 to assume an unstable state for a predetermined interval of time. Thus a negative triggering pulse at terminals 15 causes a positive rectangular pulse to appear at plate 16 of tube 11 and a negative rectangular pulse to appear at plate 17 of tube 12 both having a duration equal to said predetermined interval of time. From plate 17, lead 18 is taken to grid 19 of tube 20. Tube 20 is a normally conducting tube since grid 19 is connected to cathode potential through resistor 21. When, however, multivibrator 13 is triggered into its unstable state and plate 17 is driven negative, tube 20 is held non-conducting during the entire interval defined by that unstable state. There tends to appear at output terminals 22 a positive rectangular pulse the duration of which is, of course, determined by multivibrator 13. It will be seen that tube 23 also contributes to the formation of the output signal at terminals 22, since, if it is conducting, non-conduction by tube 20 is unable to maintain the rectangular positive pulse it tends to produce. Tube 23 differs from tube 20 in that it is held normally non-conducting by connection of its grid 24 to C− potential. Thus, a positive signal of amplitude great enough to overcome this bias must be applied to grid 24 before tube 23 affects the output signal at terminals 22. Further, it will be evident that if, during the non-conducting period of tube 20, tube 23 is rendered periodically conducting, the output at terminals 22 will consist, not of a single rectangular positive pulse of duration equal to the unstable interval of multivibrator 13, but will comprise a series of shorter positive pulses. The duration of these positive pulses will be determined by the intervals between the periodic conducting states of tube 23 and the spacing between the pulses will be determined by the durations of the periodic conducting states of tube 23. The entire period defined by multivibrator 13 then constitutes the overall interval required for the series of positive pulses at terminals 22. Multigrid tube 25 and its associated circuit components comprise a form of transitron oscillator and the means by which tube 23 is periodically rendered conducting. The transitron oscillator is normally inoperative but functions to produce a sine wave voltage at output lead 26 whenever grid 27 of tube 25 is raised above cutoff potential. This grid 27 is responsive to the positive signal which appears at plate 16 of tube 11 when multivibrator 13 is triggered into its unstable state and the transitron oscillator is thus rendered operative only during that state. The bias ordinarily maintained at grid 24 of tube 23 is of such an amplitude that tube 23 is caused to conduct only in response to the most positive portions of the positive half cycles of sine wave voltage appearing at point 26. In producing a pulse group, multivibrator 13 is so constructed as to generate a time interval which defines the interval occupied by the pulse group as a whole; the frequency of the transitron oscillator is so chosen as to produce the desired number of pulses in the group; and the bias on tube 23 is so fixed that the pulse spacings are of proper duration. In this connection, it should be pointed out that, although a transitron oscillator such as that shown may be keyed (by the positive signal from multivibrator 13) from quiescence into operation in such a manner that the sine wave produced always starts in the same phase and reaches the same amplitude on the first positive half cycle as is maintained during continuous oscillation, the time relation of the first positive half cycle may not necessarily bear such a time relation to the initial positive excursion at terminals 22 that the first pulse of the series is of the same duration as following pulses. In general, the operation of the transitron oscillator must be delayed slightly after the triggering of multivibrator 13 in order to secure the desired time relations. A suitable capacitor 28, between grid 27 of tube 25 and ground introduces this required delay since it slows down the rise time of the positive signal from multivibrator 13. It will be evident that the pulse group generator of FIG. 2 may be so constructed as to produce any desired number of pulses, each of a duration and so spaced (by proper choice of bias for tube 23) that the number generated constitutes the maximum number that may be included in the predetermined interval defining the pulse group as a whole. As aforesaid, the video pulses produced by pulse group generator 3 of FIG. 1, of which an actual circuit is shown in FIG. 2, may be employed to key pulse type transmitter 4 of FIG. 1 in such a manner that there is emitted via antenna 5 a group of pulse type signals of high frequency energy having the same group structure as the group produced by generator 3. There is thus emitted via antenna 5 a plurality of signals time related in a predetermined manner and possessing predetermined duration characteristics.

In the preferred form shown in FIG. 1, receiver equipment 2 comprises antenna 6, high frequency amplitude control section 7, detector section 8, pulse group discriminator 9, and utilization device 10. Antenna 6 may be of the same type as antenna 5 employed with the transmitter equipment. High frequency amplitude control section 7 is preferably of the type described in detail in copending application, Serial No. 605,165, entitled "Communication Circuit," filed July 14, 1945, by J. Carl Seddon. As described and shown therein, it may comprise either a plurality of high frequency amplifiers cascaded to form a T.R.F. amplifier section or it may comprise such a cascade of amplifiers preceded by a converter section so as to comprise an intermediate frequency amplifier section. In either case, the grid return circuits of the certain or all of the cascaded amplifier stages are so constructed and have a time constant such that high frequency amplitude control section 7 operates, in response to a signal stronger than a signal received for a certain period previous, to block effectively weaker signals subsequently received for a certain period. This will be recognized as a "quick acting" automatic volume control inasmuch as a strong signal following and in the presence of a weaker signal will prevent the further amplification of that weaker signal to block it for a period of time determined by the time constants of the grid return circuits. High frequency amplitude control section 7 also operates to limit its output so as to apply to detector section 8 signals of uniform amplitude regardless of wide variations in signal strength at antenna 6. This is advantageous since it provides a uniform amplitude signal by clipping off rough and irregular pulse tops so as to stabilize the operation of detector section 8 and discriminator 9.

Figures 3, 5:
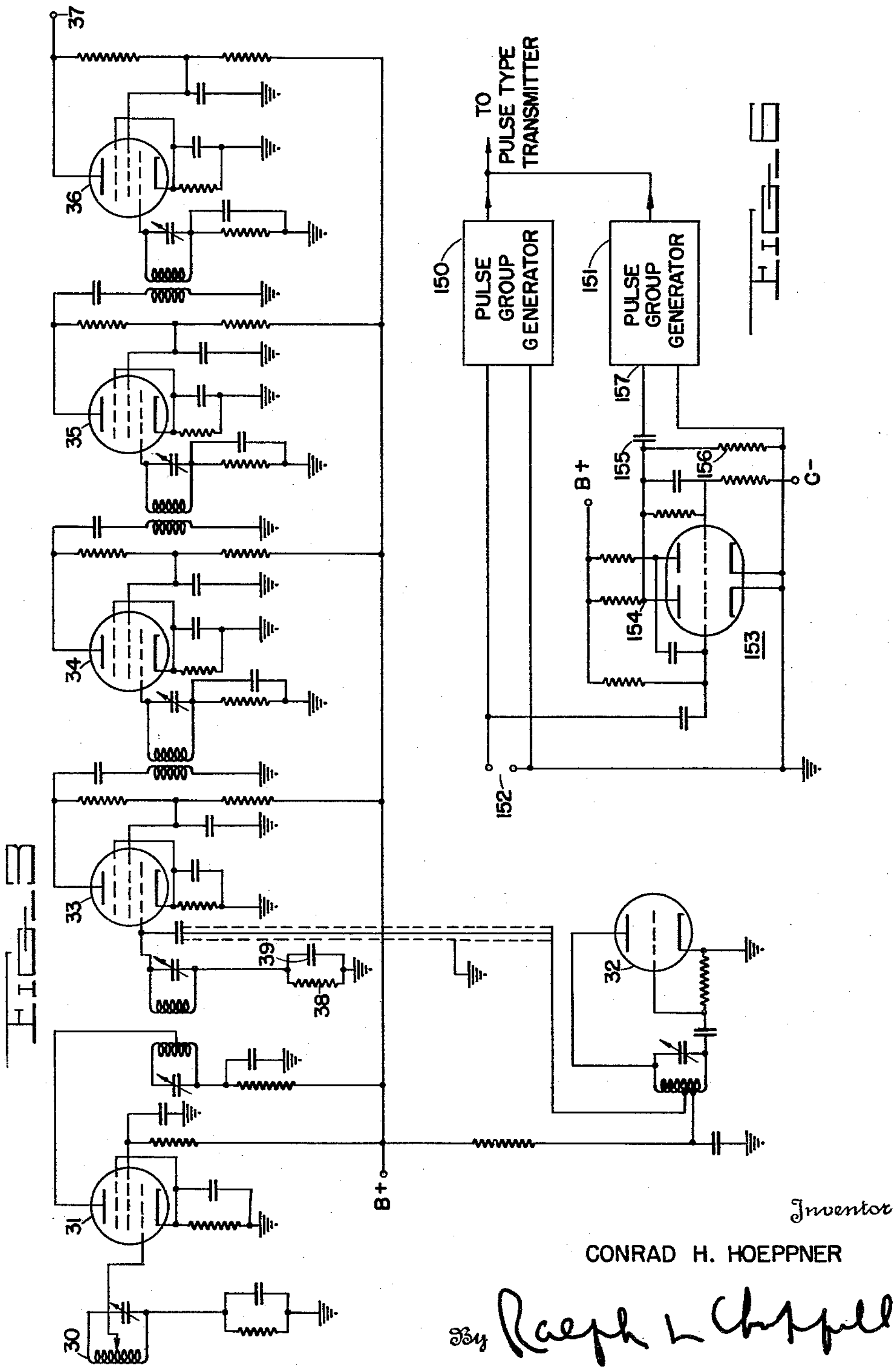
FIG. 3 illustrates by circuit diagram one of the forms which another component of FIG. 1 may assume.
FIG. 5 is a series of waveforms found useful in explaining the embodiments shown in FIGS. 1 and 6.

The actual circuit which may be used for high frequency amplitude control 7 is shown in FIG. 3 in the form in which a converter precedes a series of cascaded intermediate frequency amplifiers in the well known superheterodyne manner. Received antenna signals are impressed upon input transformer secondary 30 and are changed in frequency to the intermediate frequency by means of the converter section comprising mixer tube 31 and oscillator tube 32. The signals, at the intermediate frequency are then amplified by the cascaded amplifier tubes 33, 34, 35, and 36 and appear at output point 37 for application to detector 8 of FIG. 1. The various amplifier stages are substantially identical as shown by the circuitry. Each has a grid return ararngement which includes a parallel combination of resistance and capacitance typified by resistor 38 and capacitor 39 in the grid return circuit of tube 33. The elements of these parallel combinations are chosen of such a value that when a signal of sufficient strength to cause grid current to flow in the tube involved is applied, the capacitor element charges rapidly to develop a bias on the tube. This bias drives the tube into that region of its operating characteristics in which amplification is greatly reduced. Thus a weaker signal than that causing grid flow following immediately thereafter is subjected to negligible amplification and is thereby blocked. The bias voltage is dissipated through the resistive element after a certain period to render the tube sensitive once more.

It will be seen that tube 36 will be the first to block a weaker signal since the signals applied to it receive the greatest amplification. As stronger and stronger signals are received at the antenna, tube 35, then tube 34, then tube 33 and even tube 31 may be caused to draw grid current and block weaker signals. Thus the amplitude control functions, in response to a signal of given strength to block weaker signals subsequently received for a period of time. This is done in such a manner (by the succession of grid return circuits) that the given signal may have a range of values from several microvolts to over 100 volts. Further, the signals which do reach output 37 have been of such strength as to cause grid current flow in a precedent amplifier and thus be limited in amplitude to a uniform value. This action eliminates the ragged tops sometimes characterizing such signals. Detector 8 may be of any conventional design capable of receiving the amplified high frequency pulses at the output of section 7 and producing at its own output the envelopes of those pulses. Pulse group discriminator 9 is preferably of the type shown and described in detail in my copending application, Serial Number 628,638, entitled "Pulse Group Discriminator," filed November 14, 1945. As described therein discriminator 9 is capable of producing an output signal for application to utilization device 10 only in response to a predetermined number of pulse signals each possessing predetermined duration characteristics all occurring within a predetermined interval of time. In addition, discriminator 9 ignores signals not satisfying the necessary conditions to the extent that such signals fail to so effect the discriminator that it is unable to respond to the intended pulse group. Thus, detector 8 may apply a wide variety of signals to discriminator 9 without disarming it so that it fails to function as intended.

Figure 4:
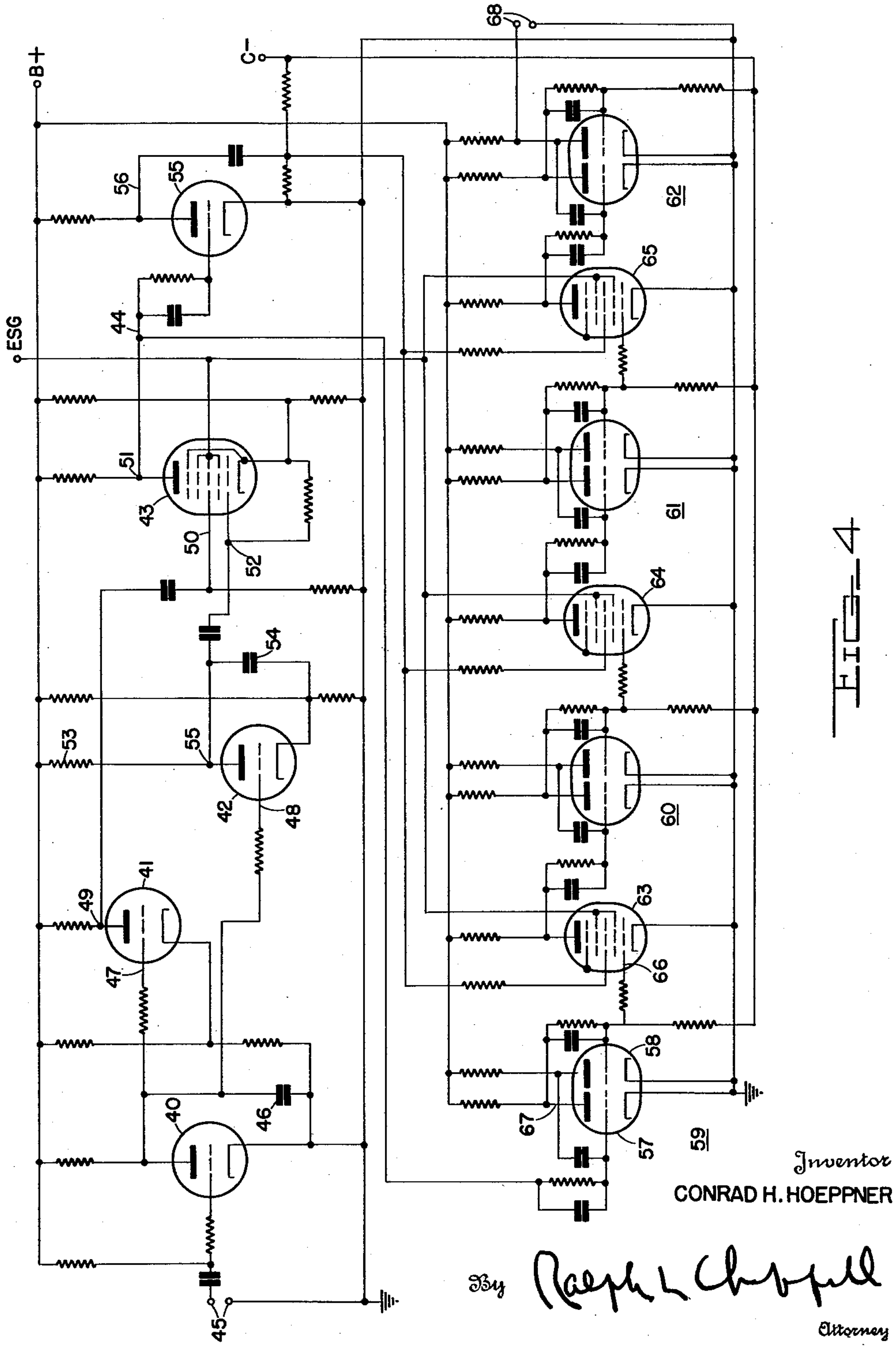
FIG. 4 illustrates by circuit diagram ane of the forms which still another component of FIG. 1 may assume.
Figure 5:
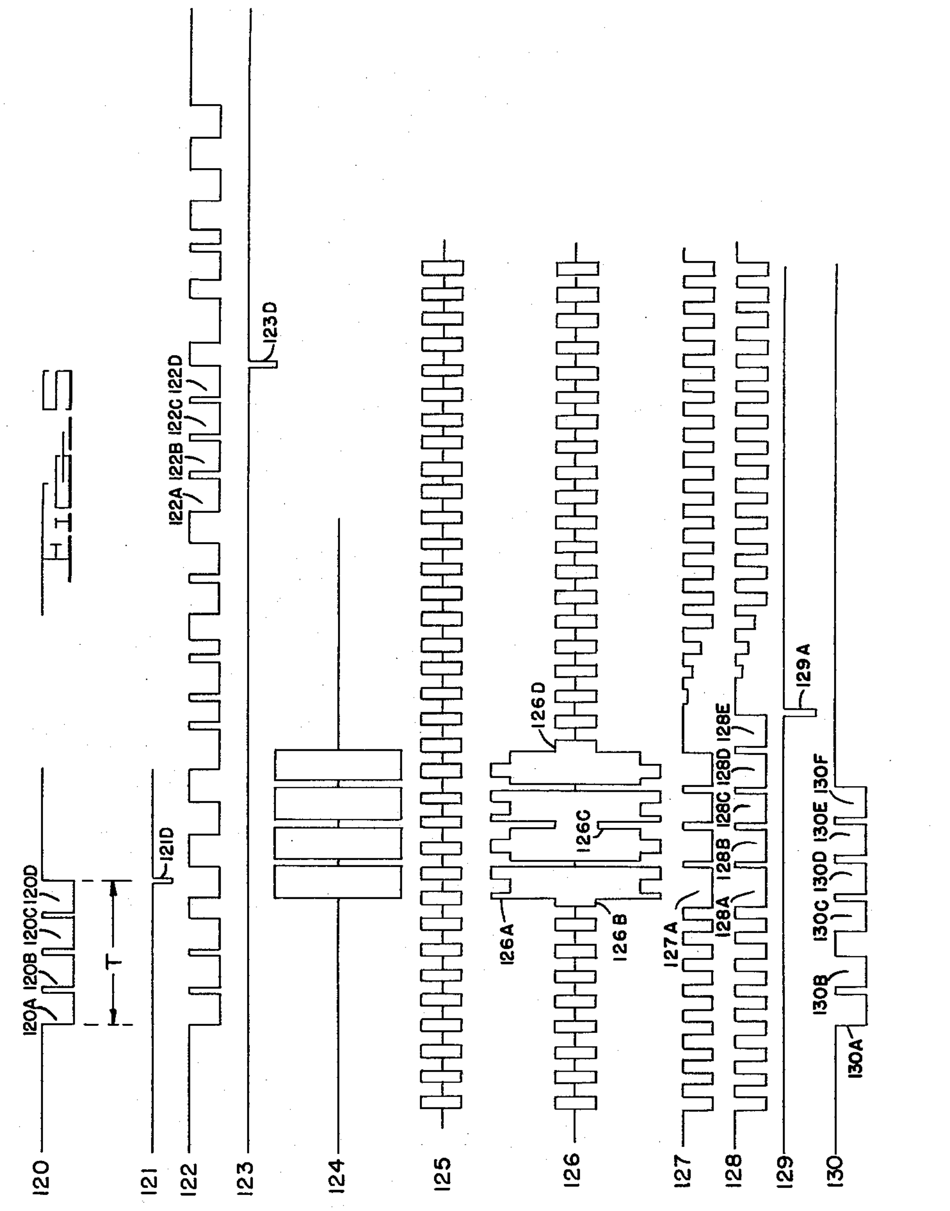

An actual circuit for accomplishing this pulse group discrimination is shown in FIG. 4. Vacuum tubes 40, 41, 42 and 43 together with their associated circuit elements comprise a means of producing triggering pulses at lead 44 from each of only those electrical impulses applied at input 45 which possess certain predetermined duration characteristics. There are other circuit arrangements which may be employed to achieve the same purpose but this one has been selected since its operation is described in detail in my copending application, Serial No. 608,834, entitled "Pulse Width Discriminator," filed August 3, 1945. Briefly, a negative electrical impulse applied at input 45 drives tube 40 below cutoff and causes capacitor 46 to charge up in a nearly linear manner for the duration of the applied impulse and then to discharge rapidly as tube 40 is again rendered conducting at the end of the impulse. This will be recognized as a conventional sawtooth generator the output of which is applied both to grid 47 of tube 41 and grid 48 of tube 42. The amplitude of the output sawtooth which is applied to tubes 41 and 42 is, of course, a function of the duration of the applied electrical impulse.

Tube 41 is so biased at its cathode by the voltage divider between B+ potential and ground that the sawtooth must achieve an amplitude corresponding to a predetermined minimum duration of electrical impulse at input 45 before grid 47 is raised high enough in potential to allow tube 41 to conduct. When that minimum duration occurs and that corresponding amplitude is achieved, a rectangular negative pulse appears at plate 49 of tube 41 of a duration determined by the interval of time between the unbiasing of tube 41 and the end of the electrical impulse applied at input 45. This rectangular negative pulse is differentiated so as to apply a sharp positive pulse to grid 50 of tube 43 at the end of the rectangular negative pulse (and hence at the end of the impulse at input 45). This sharp positive pulse overcomes the bias supplied at the cathode of tube 43 by the voltage divider between B+ and ground so as to cause tube 43 to conduct and produce a negative triggering pulse at plate 51 for application to lead 44. Tube 42 performs in a manner similar to tube 41 except that its cathode bias is greater and a sawtooth of greater amplitude corresponding to an applied electrical impulse of greater duration is required before tube 42 will conduct. When tube 42 conducts, its plate goes negative and biases off tube 43 at grid 52. Resistor 53, through which capacitor 54 recovers its charge after tube 42 is rendered conducting and then non-conducting, is of such a value that plate 55 of tube 42 rises slowly at the end of an applied electrical impulse at input 45 of a duration great enough to unbias tube 42. Thus, if an impulse of a duration less than that required to unbias tube 41 is applied to input 45, no triggering pulse is produced by tube 43 and applied to lead 44. If an impulse of a duration great enough to unbias tube 41 but too small to unbias tube 42 is applied to input 45, a triggering pulse is produced by tube 43 and applied to lead 44. If, however, tube 42 is unbiased, it holds tube 43 cut off during the short interval when tube 41 would ordinarily render it conducting to produce a triggering pulse. By this means, both "underwidth" and "overwidth" discrimination is accomplished. Tube 55 represents a phase inverter of common arrangement so disposed that the negative triggering pulses appearing on lead 44 become positive triggering pulses when they appear on lead 56 at the output of the phase inverter.

Dual triode tubes 57 and 58 represent the vacuum tube components of a conventional "one-kick" or delay multivibrator 59 similar in construction and function to multivibrator 13 of FIG. 2. From the circuit it will be seen that 60, 61, and 62 represent similar multivibrators and that the four comprise a sequence having multigrid tubes 63, 64, and 65 arranged between the successive members. These three multigrid tubes are held non-conducting by the bias on their first control grids except during the interval defined by the unstable state of the particular multivibrator connected to that first control grid. This is typified by the connection of grid 66 of tube 63 to plate circuit 67 of multivibrator 59. When a particular multivibrator is in its unstable state so as to allow the multigrid tube which it controls to conduct, a positive pulse on lead 56 from phase inverter 55 causes the multigrid tube to conduct and impress a triggering pulse on the subsequent multivibrator. Thus, multivibrator 59 must be in its unstable state before it allows a triggering pulse to reach multivibrator 60 through tube 63 and so on down the sequence of multivibrators. When such a series of pulses is received at input 45 as to finally cause multivibrator 62 to be triggered, an output signal appears at terminals 68. In operation, it will be seen that the pulse width discriminator section will produce triggering pulses at leads 44 and 56 separated in time by at least an interval slightly greater than the pulse width to which the width discriminator is designed to respond. The periods of multivibrators 59, 60, and 61 have each been chosen in such a manner that the respective multigrid tube 63, 64, or 65, controlled thereby is responsive to a triggering pulse on lead 56 only if that triggering pulse occurs with a minimum of time separation from the immediately preceding triggering pulse. Thus, for multivibrator 62 to be triggered and an output signal to appear at terminals 68, four pulses, each of a predetermined duration and all occurring within a predetermined minimum interval must be applied at input terminals 45.

Utilization device 10 of FIG. 1 may be any desired means of recording or indicating the receipt of an intelligence bearing pulse group such as a relay, signal lights or an oscilloscope.

In operation, let it be assumed that pulse group discriminator 9 of FIG. 1 is so constructed as to produce an output pulse only in response to a group of four pulses separated from each other by a time interval small in comparison to the individual pulse duration. It will be seen that, if any of the pulses is too narrow, discriminator 9 will reject it as not satisfying the pulse duration condition. If any of the pulses are two wide, the group cannot satisfy the condition that four of them occur within a predetermined interval. If any two of the pulses have too great a spacing, the group cannot satisfy the time relation condition between the pulses. With reference now to FIG. 5, in which voltage variations on the vertical scale are plotted against time on the horizontal scale, waveform 120 represents the pulse group structure which must exist in order to cause discriminator 9 to produce an output signal. This group comprises four negative pulses 120A, 120B, 120C, and 120D spaced each to each in such a manner that all occur within interval T. Waveform 121 represents the time relation of the output signal applied to utilization device 10 in response to the pulse group of waveform 120. Waveforms 122 and 123 indicate the response of discriminator 9 to a series of signals including the group comprising the four pulses 122A, 122B, 122C, and 122D. Examination reveals that, while some of the preceding and following signals of waveform 122 resemble the four pulse group, none fulfill the conditions heretofore set forth. Examination further reveals that discriminator 9 not only ignored unintended signals but it did so in a manner which did not prevent it from responding to the 122A, 122B, 122C, and 122D group so as to produce output signal 123D. It would appear that discriminator 9 is in itself a complete answer to the problem of interference. Such is not the case since the series of signals depicted by waveform 122 includes no unintended signal coexistent with the intended four pulse group. For purposes of illustration, an enemy jamming signal might be transmitted continuously during an interval in which it is desired to transmit a four pulse group. Such a continuous signal will, by virtue of the practical problems involved, be of lower strength than a short duration low repetition frequency signal such as that used for the communication signal. As is well known, a low repetition rate signal of short duration but very high peak power may be generated by transmitter equipment which on continuous duty would have a low power output. In spite of this fact, a receiver may not ordinarily be reduced in sensitivity to the point where it will ignore the jamming signal since, with changes in atmospheric conditions and in the relative locations of a receiver and transmitter, the communication signal strength varies so as to require a flexibility of sensitivity. Thus, the receiver, in the absence of a communication signal is ordinarily sensitive enough to respond to the jamming signal. When an intended signal reaches the receiver antenna simultaneously with the jamming signal, the jamming signal has the ability to "stretch" the elements of the intended signal so as to alter its characteristics in certain respects. In waveform 124 is illustrated an intended signal represented by pulse envelopes 124A, 124B, 124C, and 124D. In waveform 125 is shown a typical jamming signal. Waveform 126 represents the combined signal as it appears at antenna 6 of FIG. 1. In waveforms 124, 125, and 126 the high frequency oscillations are not shown but are to be understood as existing rather than the more simple form of pulse envelope. From waveform 126, it will be seen that the four pulses of waveform 126 have lost a considerable element of their identity by combination with the jamming signal. The irregular pulse tops as at 126A are not particularly important since amplitude clipping will remove them but the jamming signal has caused stretching at the base of the pulses. This may be observed at points 126B, 126C, and 126D. Obviously linear amplification of the signal in waveform 126 followed by detection would result in the application to discriminator 9 of a group of pulses not answering the specificity conditions. Depending upon the level at which limiting occurred, discriminator 9 might receive only three signal pulses, all broader than the intended pulse width. Under such circumstances, the jamming signal would have accomplished its purpose.

It is the function of high frequency amplitude 7 control section to block, in response to the first of the four pulses of waveform 124 any weaker signals which follow. Thus the jamming signal is blocked and there appears at the output of detector 8 the signals represented by waveform 127. Since the effect of the four pulse group upon the amplitude control means does not disappear for a period of time, the jamming signal only gradually returns to full amplification. Further, since the first of the four pulse groups arrived when a jamming signal was already in existence, the first pulse was stretched as at 127A. Thus, the pulse group still does not satisfy the conditions of discriminator 9.

In operation therefore, pulse group generator 3 of FIG. 1 is constructed to produce a five pulse group in such an order that the last four are time related in the required manner and possess the required duration characteristics. The loss of the first of the five pulse group through stretching as at 128A in waveform 128 still leaves pulses 128B, 128C, 128D, and 128E available to satisfy the conditions of specificity so that an output signal such as 129A of waveform 129 is applied to utilization device 10. By the arrangement shown and method described, the radio pulse communication system has been shown not only to be able to respond only to a particular signal and to be able to respond to that particular signal regardless of preceding signals but also to be able to respond even in the presence of interfering signals.

While an enemy monitor might construct a somewhat similar receiver, there is little likelihood of his constructing one with all of the inherent features of receiver equipment 2 of FIG. 1. Let it be assumed that he has developed the fact that the message element comprises four pulses spaced as described and therefore constructs a receiver to monitor a transmission. Unless that receiver has the "limited memory" characteristic of the pulse group discriminator described in my copending application supra, so as to be able to respond to a desired signal regardless of immediately preceding signals, the pulse communication system shown in FIG. 1 may readily be employed to dupe his receiver and cause it to ignore the transmission. For example, transmitter equipment 1 of FIG. 1 may be employed to produce the pulse group shown in waveform 130 of FIG. 5. If pulse 130A be lost through stretching, there still remain five pulses each of proper width. The system of FIG. 1 ignores pulse 130B and proceeds to produce an output signal in response to 130C, 130D, 130E and 130F. A receiver discriminator without the "limited memory" characteristic would not ignore 130B and would therefore ignore the four pulse group because of the spacing between 130B and 130C. Were the enemy receiver designed to respond to the pulse group regardless of the spacing between 130B and 130C, its specificity would be reduced unless accomplished by means herein described. Reduced specificity would render it the easy prey of jamming, interference, and other transmissions.

In FIG. 6 is shown a pulse group generator arrangement whereby the transmission shown in waveform 130 may be secured. Pulse group generators 150 and 151 may be of the same type as shown in FIG. 2 except that generator 150 is employed to produce the two pulses 130A and 130B while generator 151 is employed to produce the four pulses 130C, 130D, 130E, and 130F. Generator 150 produces its two pulse group in direct response to a keying impulse at input 152 while the operation of generator 151 is delayed as desired to secure the time relation between its four pulse group and pulses 130A and 130B. Multivibrator 153, similar to multivibrator 13 of FIG. 2 is employed to introduce the required delay. It functions, in response to the keying signal at input 152 to produce a rectangular positive pulse at plate 154 the trailing edge of which occurs at the instant it is desired to initiate the four pulse production. Capacitor 155 and resistor 156 comprise a differentiating circuit which converts the trailing edge of the rectanglar positive pulse at plate 154 into the delayed negative keying signal at input 157 of generator 151. The flexibility of such an arrangement is obvious and may be employed to secure other variations and combinations of pulse groups as the situation may require.

Since certain further changes may be made in the foregoing construction and different embodiments of the invention may be made without departing from the scope thereof, it is intended that all matter shown in the accompanying drawings or set forth in the accompanying specification shall be interpreted as illustrative and not in a limited sense.

The invention described herein may be manufactured and used by or for the Government of the United States of America for governmental purposes without the payment of any royalties thereon or therefor.

What is claimed is:

A radio pulse signaling system comprising pulse group generating means for generating a pulse signal comprising a predetermined plurality of predeterminately spaced radio frequency pulses within a predetermined interval of time, each of said pulses in said plurality being substantially identical and having a predetermined amplitude and a predetermined pulse width, the time spacing between pulses in said plurality being small with respect to pulse width such that said plurality is the maximum number of pulses which may be included in said predetermined interval of time, means for transmitting the output of said pulse group generating means, means for receiving the transmitted output of said generating means including a gain controlled amplification channel, time constant circuit means incorporated in said channel selectively responsive to the amplitude of a received pulse signal of predetermined amplitude in such a manner as to block subsequently received signals of lesser amplitude for a predetermined period of time, means for detecting the amplified output of said channel, and pulse discriminator means including pulse width discriminating means and pulse group discriminating means connected in cascade, said pulse width discriminating means responsive to and adapted to pass pulses of said predetermined width, said pulse group discriminnating means responsive to and adapted to pass groups of pulses of said plurality occurring within said predetermined interval of time, and utilization means connected to said pulse discriminator means for utilizing the output thereof.

References Cited in the file of this patent

UNITED STATES PATENTS

| | | |
|---|---|---|
| 2,023,446 | Schroeter | Dec. 10, 1935 |
| 2,199,634 | Koch | May 7, 1940 |
| 2,223,995 | Kotowski et al. | Dec. 3, 1940 |
| 2,266,401 | Reeves | Dec. 16, 1941 |
| 2,401,618 | Crosby | June 4, 1946 |
| 2,412,974 | Deloraine | Dec. 24, 1946 |
| 2,421,136 | Wheeler | May 27, 1947 |
| 2,427,691 | Prichard | Sept. 23, 1947 |
| 2,435,960 | Fyler | Feb. 17, 1948 |
| 2,464,667 | Bossman et al. | Mar. 15, 1949 |
| 2,510,054 | Alexander et al. | June 6, 1950 |
| 2,513,911 | Bliss | July 4, 1950 |
| 2,525,634 | Atwood et al. | Oct. 10, 1950 |
| 2,543,068 | Seddon | Feb. 27, 1951 |
| 2,568,265 | Alvarez | Sept. 18, 1951 |